(12) United States Patent
Hoogland et al.

(10) Patent No.: US 7,458,460 B2
(45) Date of Patent: Dec. 2, 2008

(54) STORAGE DEVICE HAVING PROTECTIVE MEANS

(75) Inventors: H. Hoogland, Krommenie (NL); J. H. Heiligers, Loosdrecht (NL)

(73) Assignee: Montan Nederland B.V., Loosdrechtsedijk (NL)

( * ) Notice: Subject to any disclaimer, the term of this patent is extended or adjusted under 35 U.S.C. 154(b) by 0 days.

(21) Appl. No.: 10/659,246

(22) Filed: Sep. 10, 2003

(65) Prior Publication Data

US 2004/0050728 A1 Mar. 18, 2004

Related U.S. Application Data

(62) Division of application No. 09/505,513, filed on Feb. 17, 2000, now abandoned.

(30) Foreign Application Priority Data

Feb. 18, 1999 (NL) .................................. 1011331

(51) Int. Cl.
B65D 85/57 (2006.01)
(52) U.S. Cl. ............ 206/308.1; 206/308.2; 206/387.11; 206/807; 264/259; 264/513
(58) Field of Classification Search .................. 206/1.5, 206/308.1, 308.2, 387.11, 459.1, 459.5, 807, 206/472; 264/259, 509, 513; 340/572.2, 340/572.5, 572.8, 572.9
See application file for complete search history.

(56) References Cited

U.S. PATENT DOCUMENTS

| | | | |
|---|---|---|---|
| 4,639,341 A * | 1/1987 | Hanamoto et al. | 264/40.1 |
| 4,784,264 A | 11/1988 | Sykes | |
| 4,863,026 A | 9/1989 | Perkowski | |
| 4,880,368 A * | 11/1989 | Hasl et al. | 425/116 |
| 4,978,005 A | 12/1990 | Sammet | |
| 4,983,348 A * | 1/1991 | Barresi et al. | 264/509 |
| 5,081,446 A | 1/1992 | Gill et al. | |
| 5,082,435 A | 1/1992 | Kuramitsu et al. | |
| 5,096,652 A * | 3/1992 | Uchiyama et al. | 264/511 |
| 5,098,626 A * | 3/1992 | Pas | 264/151 |
| 5,142,384 A | 8/1992 | Wood et al. | |
| 5,189,531 A | 2/1993 | Palmer et al. | |
| 5,217,563 A * | 6/1993 | Niebling et al. | 156/382 |
| 5,254,302 A * | 10/1993 | Yamanaka | 264/129 |
| 5,385,231 A | 1/1995 | Nowotny | |
| 5,411,140 A | 5/1995 | Byer | |
| 5,524,758 A | 6/1996 | Lupul | |
| 5,551,559 A | 9/1996 | Roth et al. | |
| 5,597,068 A * | 1/1997 | Weisburn et al. | 206/308.1 |
| 5,713,463 A | 2/1998 | Lakoski et al. | |

(Continued)

FOREIGN PATENT DOCUMENTS

DE 4242992 6/1994

(Continued)

*Primary Examiner*—Thanh K Truong
(74) *Attorney, Agent, or Firm*—Hoffmann & Baron, LLP

(57) ABSTRACT

A storage device for plate-shaped data carriers, the storage device being box-shaped and including a first and a second cover part, pivotally connected, wherein a fixing element is provided for fixing the data carrier within the storage device, the storage device being injection molded from plastic, in particular polypropylene or the like, and being closable, and an authentication element being integrally injection molded in the storage device during manufacture.

23 Claims, 7 Drawing Sheets

U.S. PATENT DOCUMENTS

| | | |
|---|---|---|
| 5,815,292 A | 9/1998 | Walters |
| 5,868,986 A | 2/1999 | Foulkes |
| 5,896,985 A | 4/1999 | Nakasuji et al. |
| 5,910,770 A * | 6/1999 | Ohara ..................... 340/572.5 |
| 5,925,302 A * | 7/1999 | Oono et al. ................. 264/267 |
| 5,984,388 A | 11/1999 | Bacon |
| 6,231,328 B1 * | 5/2001 | Atake ......................... 425/122 |
| 6,255,948 B1 | 7/2001 | Wolpert et al. |
| 6,476,817 B1 * | 11/2002 | Harper et al. ............... 345/530 |

FOREIGN PATENT DOCUMENTS

| | | |
|---|---|---|
| EP | 0 762 357 A | 3/1997 |
| FR | 2 605 747 A | 4/1988 |
| WO | WO 96/21172 | 7/1996 |
| WO | WO 97/20315 | 6/1997 |
| WO | WO 98/19305 | 5/1998 |

* cited by examiner

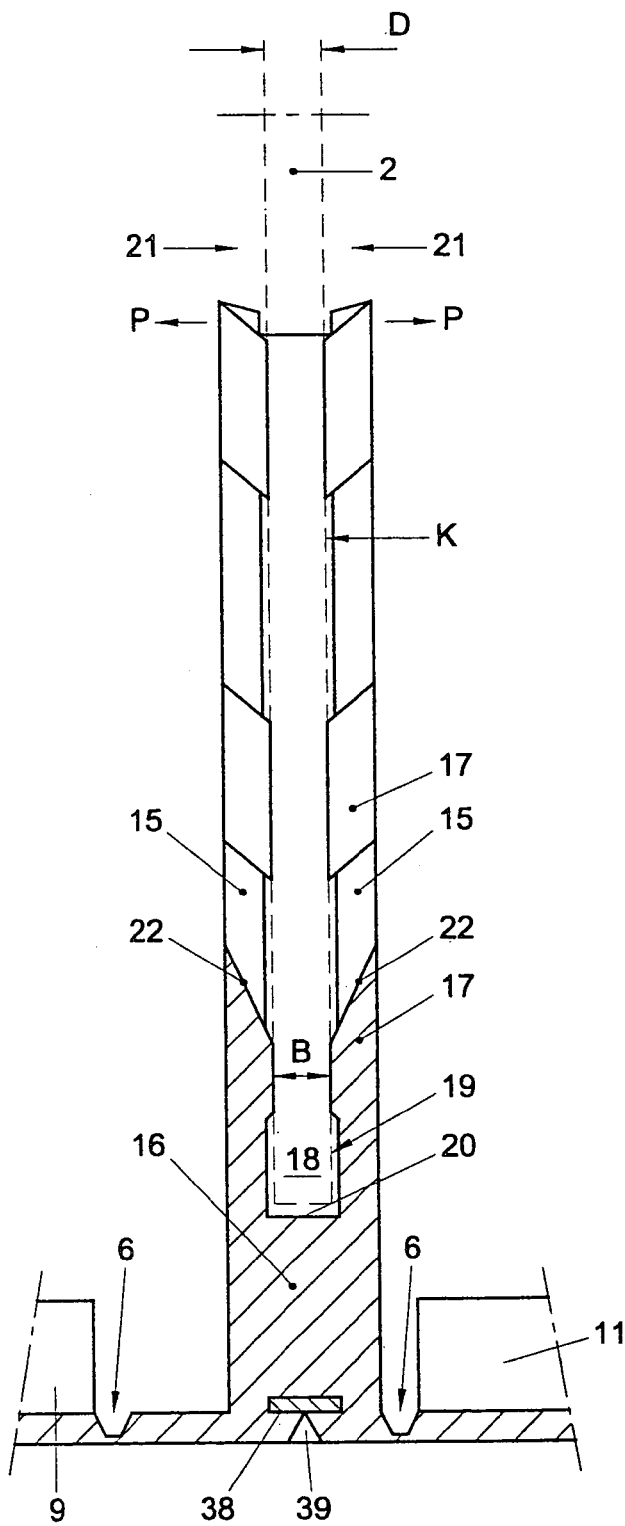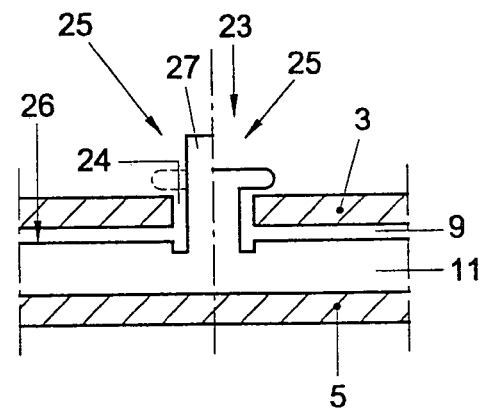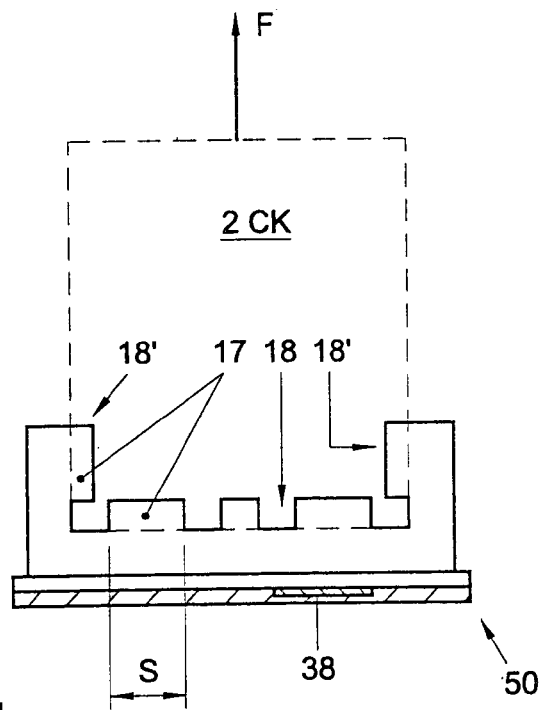
Fig. 2a
Fig. 7
Fig. 3

STORAGE DEVICE HAVING PROTECTIVE MEANS

This application is a divisional of U.S. application Ser. No. 09/505,513 filed on Feb. 17, 2000 now abandoned.

This application asserts priority to Netherlands Application No. 1011331 filed on Feb. 18, 1999. The specification of Netherlands Application No. 1011331 is hereby incorporated by reference.

The invention relates to a storage device for plate-shaped data carriers. Such storage device is known from international patent application WO 97/20315.

This known storage device is box-shaped, at least in closed condition, and comprises a first and a second cover part, pivotally interconnected for the opening and closing thereof. Provided within the storage device are fixing means for retaining the data carrier. This known storage device is presently substantially manufactured through injection molding. Such device is, for instance, intended for storing CDs, diskettes, minidisks, credit cards or the like.

European patent application 0 420 350 teaches a storage device comprising a slightly box-shaped closing part with bottom and vertical walls, while the second closing part is cover-shaped and can be pressed against the first closing part for closing it. Adjacent a central area thereof, the first closing part comprises resilient fingers capable of engaging a central opening of a CD so as to retain said CD in a position approximately parallel to said bottom face. The first and second closing parts are detachably interconnected. Such box is intended for storing CDs and is usually referred to as a jewel box.

These known storage devices have as a drawback that the data carriers can easily get loose therefrom, and more in particular that they can easily be removed therefrom, while, moreover, the storage devices themselves can easily be removed, imitated, damaged or otherwise manipulated fraudulently.

The object of the invention is to provide a storage device of the type described in the preamble, which is more suitably and more universally applicable for storing data carriers. In particular, the object of the invention is to provide storage devices which offer better protection against theft and/or imitation.

Injection molding storage devices of the present type offers the advantage that they can be manufactured in a simple and fast manner, and with great precision. The advantage achieved by including, during injection molding, protective means in or on the storage device, is that these protective means cannot be removed from the storage device, or at least not without clearly visible damage. This means that unacceptable manipulation of the storage device will be directly visible thereon, so that authenticity can be guaranteed. Moreover, the advantage achieved by injection molding the protective means integrally with the device is that they can be secured directly during the manufacture of the storage device, so that no further fastening means or operations are necessary.

In this context, "protective means" should at least be understood to means anti-theft means and authentication means.

It is preferred that a CD box of the present type be injection molded from polypropylene or a like plastic having a high shock-absorbing power, a suitable elastic modulus, relatively high flexibility and dimensional stability. Such storage device is particularly suitable for protecting data carriers, in particular during dispatch thereof, for instance via the mail, courier services and the like. Indeed, such storage box will protect the data carrier in a particularly effective manner against impact loads and the like occurring during transport, while the data carrier cannot be removed from the storage device without any trouble.

The product-specific printing of at least a part of the storage device offers the advantage that it is easily and unequivocally recognizable whether the storage device belongs to the data carrier included therein. Moreover, on such printing, it can be readily visible whether it concerns the authentic storage device for the data carrier in question. The advantage achieved by providing the printing during manufacture of the storage device in the mold is that during manufacture, the printing forming part of the protective means is directly incorporated in or on the storage device, while the printing will adhere to the storage device in such a manner that it can no longer be removed therefrom without damage.

The use of magnetic or electronically readable means offers the advantage that the presence of or at least displacements of the storage device can readily be established by detection means suitable therefor. Thus, for instance unobserved removal of the storage devices from a shop or storehouse can be rendered considerably more difficult or can even be prevented. The magnetic or electronic means can be designed such that specific product information can be incorporated therein, so that an unequivocal relationship between the storage device and an associated data carrier can be established. This also makes it still easier to assess whether it concerns the authentic storage device. In this respect, it is preferred that the magnetic or electronic means be at least largely surrounded by the plastic from which the storage device is formed. Thus, unintended and improper manipulation thereof is rendered considerably more difficult.

The sealing means offer the advantage that a data carrier can easily be inserted into the storage device and be retained therein, in such a manner that it can no longer be removed therefrom without this being visible on the sealing means. After all, for doing so, the sealing means have to be broken. Because the sealing means are formed integrally with the storage device, in particular injection molded integrally therewith, the advantage achieved is that the sealing means cannot be broken and/or removed and, after manipulation, for instance the removal or copying thereof, cannot be placed back again or replaced by new sealing means.

The use of a holographic or comparable image forming an integral part of the storage device offers the advantage that it is protected against imitation even more properly. Indeed, reproduction of a hologram or a like image is not easily possible, while the removal thereof is not possible without damage, so that the holograms cannot be reused on other storage devices, while storage devices from which such holographic images have been removed cannot be reused either, because of the damage occurred. Such a storage device would at least be directly recognizable.

A bar-code makes the storage device easy to recognize and individualize. By integrally injection molding such barcode, in particular as an integrally formed printing, removal or alteration thereof is rendered considerably more difficult or even impossible.

In such storage device, the data carrier cannot be detached from the storage device without the sealing means being broken, in disregard of the question whether the storage device can be opened prior to the breaking of the sealing means. This offers, for instance, the possibility of viewing the data carrier in the storage device or observing further information included in the storage device without the sealing means having to be broken. Moreover, such sealing means can be used as additional protective means.

Manufacturing a storage device from a plastic having a relatively high melt offers the advantage that relatively thin-walled product parts can be manufactured with a relatively long flow travel. As a result, a storage device according to the present invention can be manufactured from relatively little material. This offers advantages in terms of economy and production, for instance due to relatively short cycle periods and low material costs. Moreover, the advantage thus achieved is that during dispatch of the storage devices with data carriers included therein, only relatively low dispatch costs have to be made. By using a plastic having a melt higher than 20, preferably higher than 30, these advantages are already obtained. However, it is preferred that an even higher melt be used, for instance higher than 40 and more in particular higher than 50. A higher melt offers the additional advantage that particularly little friction will occur between the walls of the mold and an injection molding mass moving therealong, in particular the flow skin thereof. This is advantageous in particular when, in a storage device according to the present invention, a printing is provided in the mold for inclusion in or on at least a part of the storage device, as described hereinabove, because damage to said printing is simply prevented thereby. This is partly because of the fact that for this, relatively low injection molding pressures may suffice.

Injection molding the storage device in one piece from polypropylene or a like plastic offers the advantage that the cover part cannot be separated from the bottom port or from the fixing means without any damage, so that improper manipulation of a data carrier included therein can be prevented even more simply., while it is moreover protected against damage in an even better manner. In addition, such storage device offers the advantage that it can be manufactured integrally in a fast and simple manner.

Designing the storage device in clear, transparent plastic offers the advantage that a printing can be provided therein or thereon which is visible at least on a part of the storage device from two sides thereof, for instance on the outer and inner sides of a cover part or bottom part. This readily prevents the necessity of providing such printing on two sides. Moreover, such storage device has a particularly pleasant outward appearance. By giving the printing an at least partially transparent design, the attractiveness of this outward appearance can even be further increased, while, moreover, the data carrier can be rendered at least partially visible from the outer side of the storage device, if so desired. Further, such at least partially transparent printing requires a high precision, so that the copying thereof is complicated still further.

The invention further relates to a method for manufacturing a storage device according to the present invention.

The provision of a printing in the mold prior to the introduction of a plastic injection molding mass offers the advantage that integral incorporation of the printing in or on the relevant product part to be formed can readily be provided. By providing the printing on a carrier, such that the printing with the carrier can be placed in the mold, placement becomes possible in a simple manner. By slightly expanding the carrier prior to and/or during its placement in the mold, such that the carrier is under some tension, preferably on all sides, it is easily provided that any wrinkles or the like in the carrier and, accordingly, in the printing, are removed and/or the formation thereof during placement is prevented. Thus, in a particularly simple and reliable manner, the printing with the carrier can be introduced into the mold so as to be completely smooth. It is preferred that the carrier adheres to the wall of the mold, for instance through a static load, through reduced pressure between carrier and mold part, through sticking or in another suitable manner. The plastic can then be provided against the printing and/or the carrier, such that the printing starts to form an integral part of the relevant product part, preferably the storage device formed in one piece. Partly due to the tension used, the carrier may be particularly thin and, for instance, supplied from a roll.

For this, a carrier can be used which disappears at least largely, due to the introduction of the plastic mass, or is incorporated therein entirely or partially. Alternatively, a carrier can be used which fuses with said plastic.

By providing a printing in the mold, directly on the wall thereof, for instance utilizing an impressing technique, a printing technique or the like, the advantage achieved is that no carrier is required, at least that the carrier need not be printed prior to its positioning in a mold. Preferably, the carrier is left out entirely. In particular with such a method, the printing can be adjusted for each storage device, if so desired. For instance, a printing apparatus can be used which is controlled by means of, for instance, a computer, so that for a series of storage devices, the printing can in each case be adjusted, completely or partially. In this manner, each successive printing may carry a different, unique recognition code, for further authentication. It is even possible to supply desired printings to the apparatus remotely, for instance via a telephone or computer network.

The positioning of protective means such as magnetic and/or electronic means on one or more carriers in the mold prior to the introduction of the plastic mass therein, offers the advantage that these protective means can be incorporated and fixed in the storage device in a particularly simple manner.

The invention further relates to an apparatus for manufacturing a storage device according to the invention or for using a method according to the present invention.

Further embodiments of a storage device or method according to the present invention are given in the subclaims and the specification.

To clarify the invention, exemplary embodiments of a storage device and a method, and of an apparatus for the manufacture or use thereof according to the invention, will hereinafter be further described, with reference to the accompanying drawings. In these drawings:

FIG. 1A is a side elevation view of the storage device shown in FIG. 1;

FIG. 2a is an enlarged sectional view of a storage device taken on the line 2A-2A in FIG. 2;

FIG. 3 is a partially sectional side elevation of a storage device according to FIG. 1, suitable for substantially rectangular data carriers, such as diskettes and minidisks;

Figure 6:
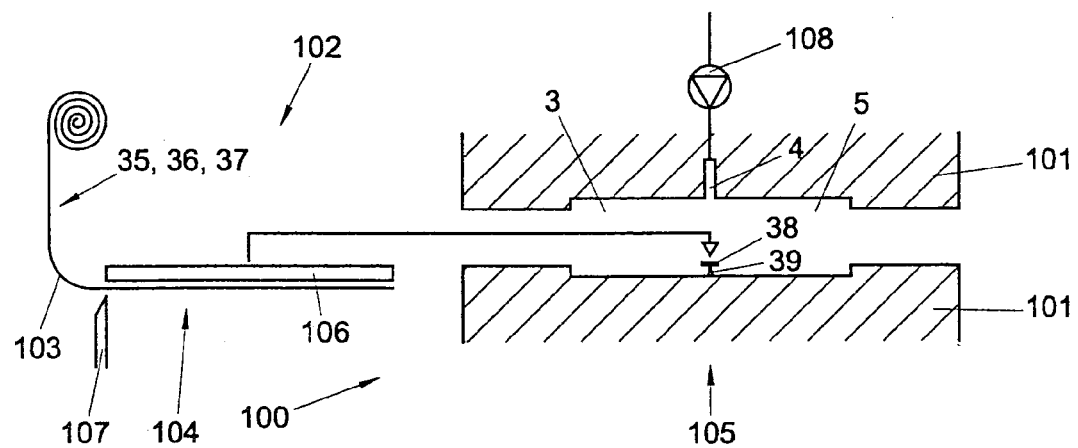
Figure 6A:
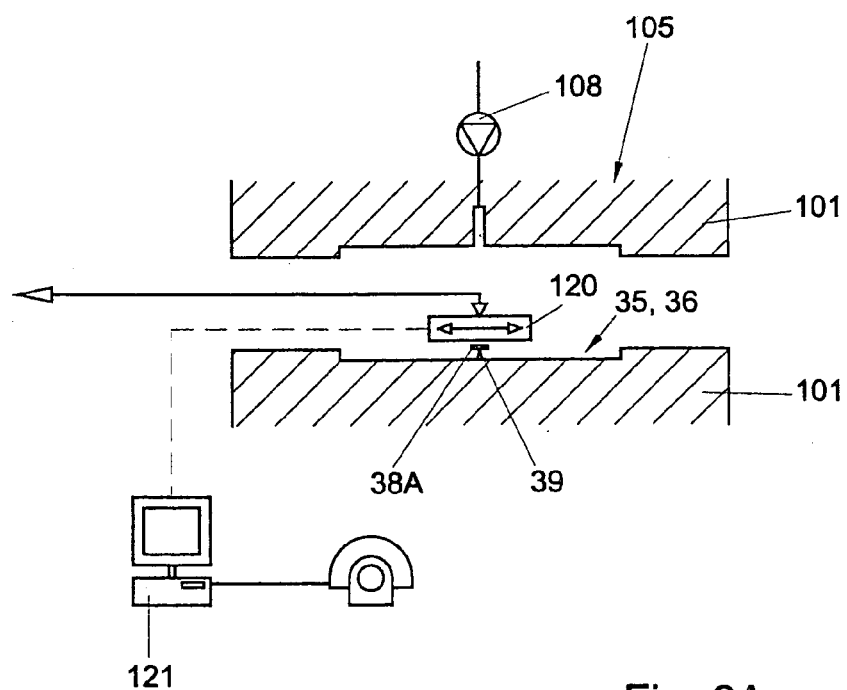
Figure 8:
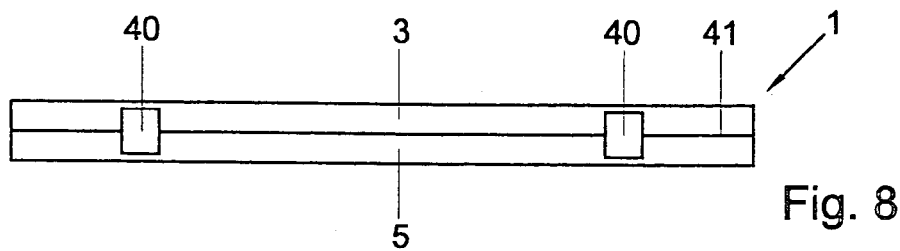
Figure 9:
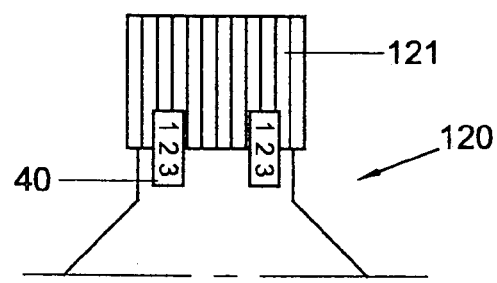
Figure 10:
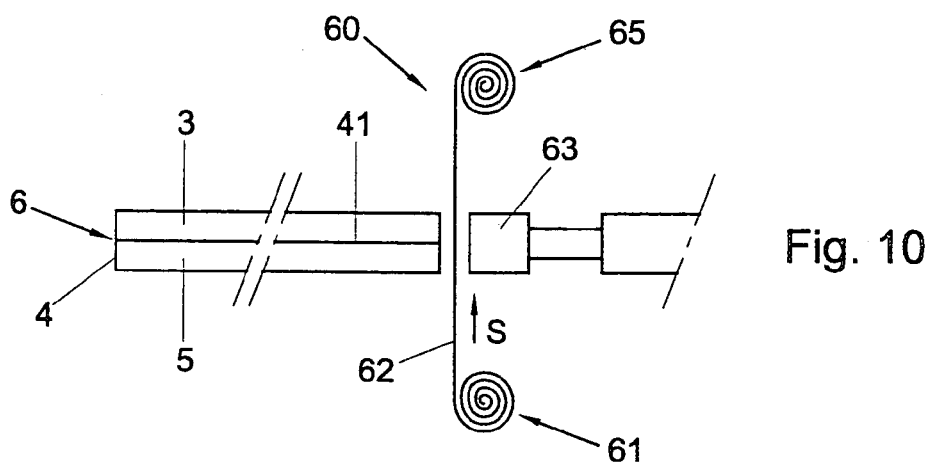
Figure 11:
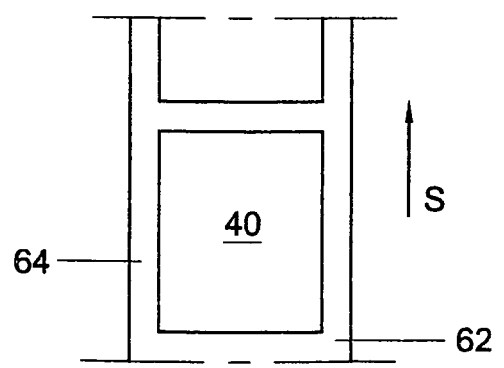

FIG. 6 schematically shows an apparatus for manufacturing a storage device according to the invention;

FIG. 6a shows an alternative embodiment of a device according to the invention;

FIG. 7 is a partially sectional side elevation of sealing means according to the invention;

FIG. 8 is a front view of a storage device according to the invention, with alternative protective means;

FIG. 9 shows an alternative embodiment of a storage device;

FIG. 10 schematically shows an apparatus for fitting protective means as shown in FIG. 8; and FIG. 11 shows a strip for protective means as shown in FIGS. 8-10.

In this specification, identical or corresponding parts have identical or corresponding reference numerals. The general construction of storage devices according to FIGS. 1-4 are discussed at length in international patent application WO 97/20315, the general construction of storage devices according to FIG. 5 are discussed at length in EP 0 420 350, which publications are understood to be incorporated herein by reference.

Figure 1:
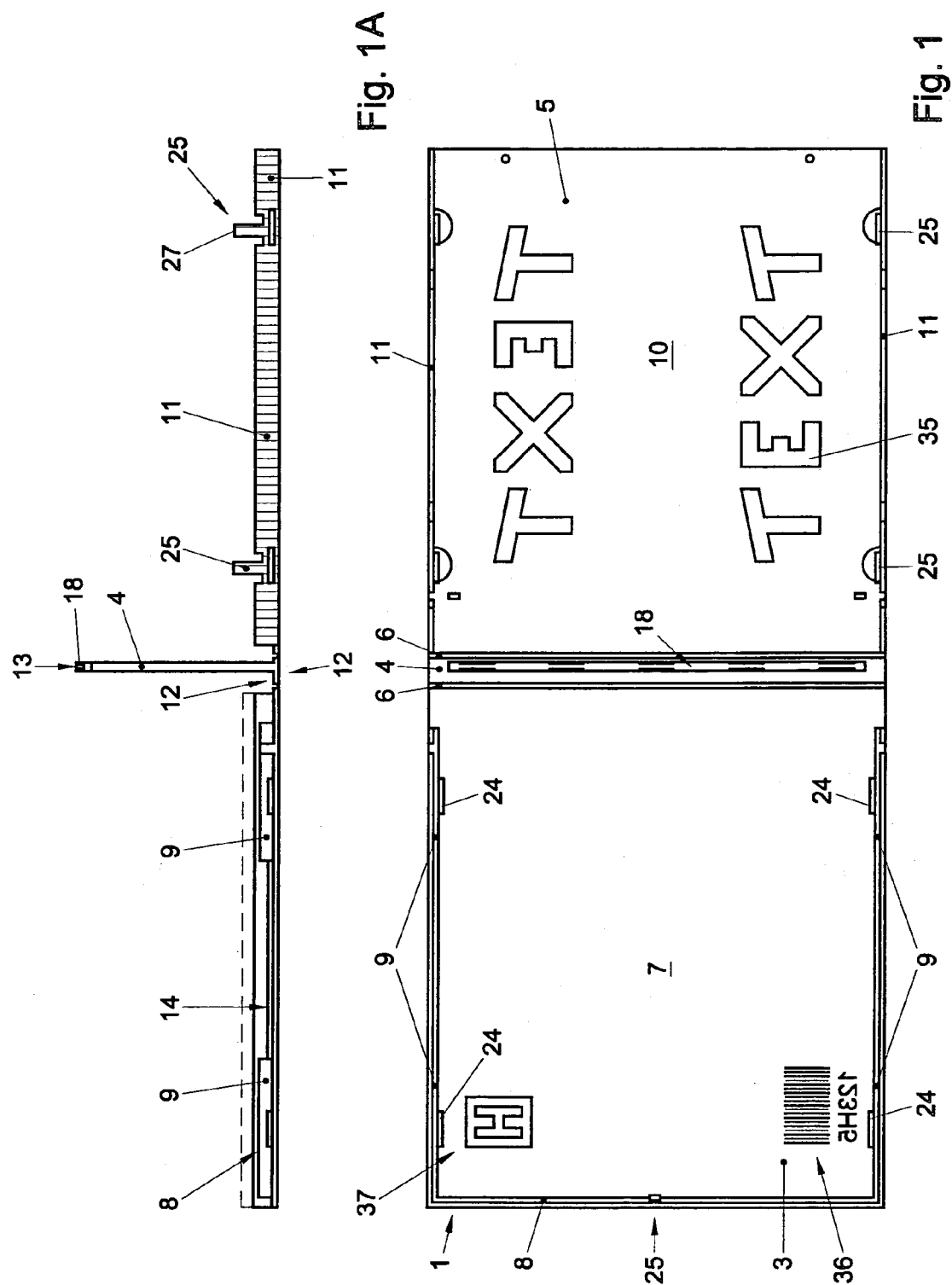
FIG. 1 is a top plan view of a storage device in open condition.

FIG. 1 shows a storage device 1 for a data carrier 2. A data carrier 2 to be stored may, for instance, be circular, such as compact discs (CD-i, CD-ROM; FIG. 3), or substantially rectangular, such as chipcards, diskettes, minidisks and the like (FIG. 5). The storage device 1 according to FIGS. 1-4 is of one-part construction and, for instance, manufactured through injection molding from a relatively environmentally friendly, recyclable plastic such as polypropylene. Polypropylene and like plastics have a relatively high resistance to shocks and tearing, a relatively favorable elastic modulus and can suitably be injection molded. Moreover, properly printable, impact-resistant and scratch-resistant plastics are preferably used. However, other plastics may also be used, if so desired. As will be further explained hereinbelow, in particular clear, transparent plastics, such as clear polypropylene, can be used in an advantageous manner.

A storage device 1 as shown in FIGS. 1-4 comprises a first closing part 3, an intermediate part 4 and a second closing part 5, interconnected via two integrated pivots 6 adjacent the bottom side, such that the closing parts 3, 5 can be swiveled from the open position shown in full lines into a closed position shown in broken lines (FIG. 1).

The first closing part 3 has a top face, a front edge 8 and two first sidewalls 9 adjoining thereto. The second closing part 5 likewise has a top face 10, two raised second sidewalls 11 and a front edge 8A. In the closed condition, the second sidewalls 11 abut against the first sidewalls 9, while the front edge 8 abuts against the front edge 8A of the second closing part 5. The bottom side 12 of the intermediate part 4 constitutes the fourth wall of the storage device 1 in closed condition, so that it is closed off in an entirely waterproof and dustproof manner. The receiving means 13 for the data carrier 2, which receiving means will be specified hereinbelow, are accommodated in the intermediate part 4 and, when the storage device 1 is in its closed condition, are accommodated in the inner space 14 thereof, possibly together with a data carrier 2 included therein.

The intermediate part 4 comprises two spaced apart wall parts 15, interconnected by transverse partitions 16, shown in enlarged view in FIG. 2A. On the side remote from the pivots 6, the walls 15 are provided with toothed clamping projections 17, while in each case two clamping projections 17 are positioned opposite each other. Enclosed between the clamping projections 17 is a groove 18 whose width B is slightly smaller than the thickness D of the data carrier 2 that is to be stored in the storage device.

Figure 2:
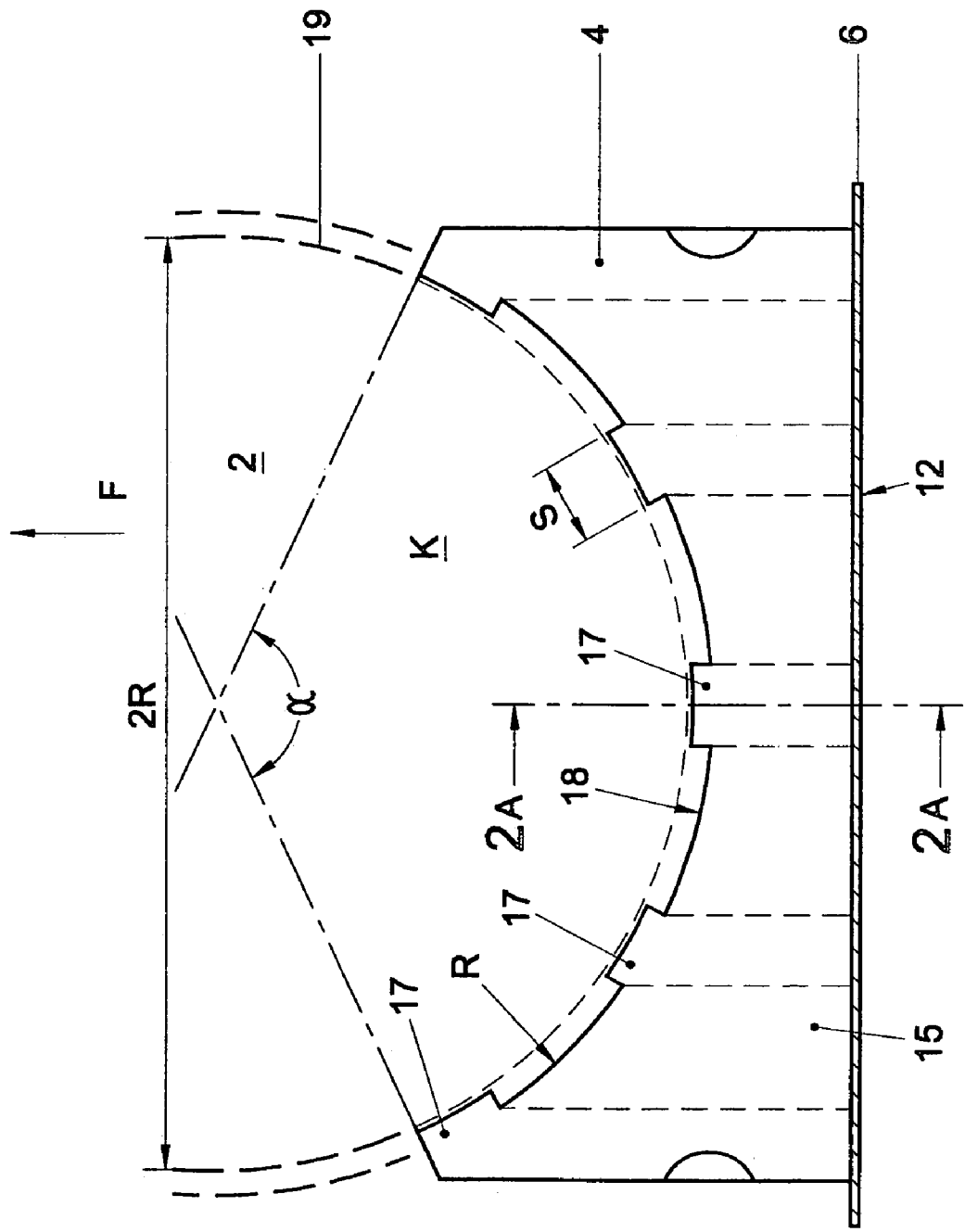
FIG. 2 is a sectional side elevation of a storage device according to FIG. 1, suitable for substantially circular data carriers such as CDs.

In the embodiment shown in FIG. 2, the groove 18 extends along a segment of a circle having a radius R which approximately corresponds to the radius of a circular data carrier, such as a CD, to be included therein. The circular segment encloses an angle α of less than 180°. Preferably, the enclosed angle α is about 120°.

In the embodiment of a storage device 50 according to the invention shown in FIG. 3, the groove 18 extends along three sides of an imaginary rectangle CK, shown in the drawing in broken lines. On the side proximal to the pivots 6, three pairs of clamping projections 17 are disposed along the groove 18, while along the two groove parts 18' that extend at right angles thereto, one pair of clamping projections is in each case provided. In this embodiment, the storage device 50 is in particular suitable for storing data carriers having a substantially rectangular shape, such as chipcards, credit cards, magnetic cards, diskettes, cassettes, minidisks and the like.

As appears from in particular FIG. 1, in the embodiment shown, a storage device according to the present invention is manufactured from clear, transparent plastic, on which a printing 35 is provided, in the embodiment shown symbolically represented by the word "text", visible through the closing parts 3, 5. There are further provided a bar-code and a holographic image 37, in the embodiment shown represented by an H. Such holographic images are generally known and are, for instance, supplied by the printer Johan Enschede, the Netherlands. The bar-code 36 and the holographic image 37 are provided, along with the printing 35, in or at least on the storage device.

For at least a portion of the printing 35, an ink luminescing under ultraviolet or infrared ink, such as a hologram structure, is preferably used, as known from patent application WO 99/45513, incorporated herein by reference.

In a storage device according to the present invention, in the embodiment shown in FIGS. 1 and 2, a magnetic strip 38 is integrally injection molded in the intermediate part 4, which strip is designed for cooperation with detection means installed in, for instance, a shop. Such magnetic strips are known per se in various embodiments. A choice therefrom is directly clear to a skilled person. Preferably, magnetic strips 38 are used which can contain remotely readable information for authenticating the storage device. By such magnetic strip, theft of the storage device with data carrier included therein can be rendered substantially more difficult or even be prevented, while, moreover, the tracing and following of the storage device during production processes can thereby be simplified.

Similarly, in the embodiment shown in FIG. 3, coils 38A are incorporated for the same or comparable purposes. Other types of transponders may also be applied.

Provided on the longitudinal walls 11 of the second closing part 5 are fingers 25, extending approximately parallel to the plane of the longitudinal walls 11, slightly displaced inwards relative to the outer side thereof. The fingers 25 extend above the top edge 26 of said longitudinal wall 11 over a height which is slightly greater than the height of the longitudinal walls 9 of the first closing part 3. At corresponding positions, openings 24 have been provided in the bottom face 7 of the first closing part 3, through which openings 24 the fingers 25 can extend, such that when the storage device 1 is closed, the top ends 27 extend beyond the bottom face 7. The fingers and openings are shown more specifically in FIG. 7.

Figure 4:
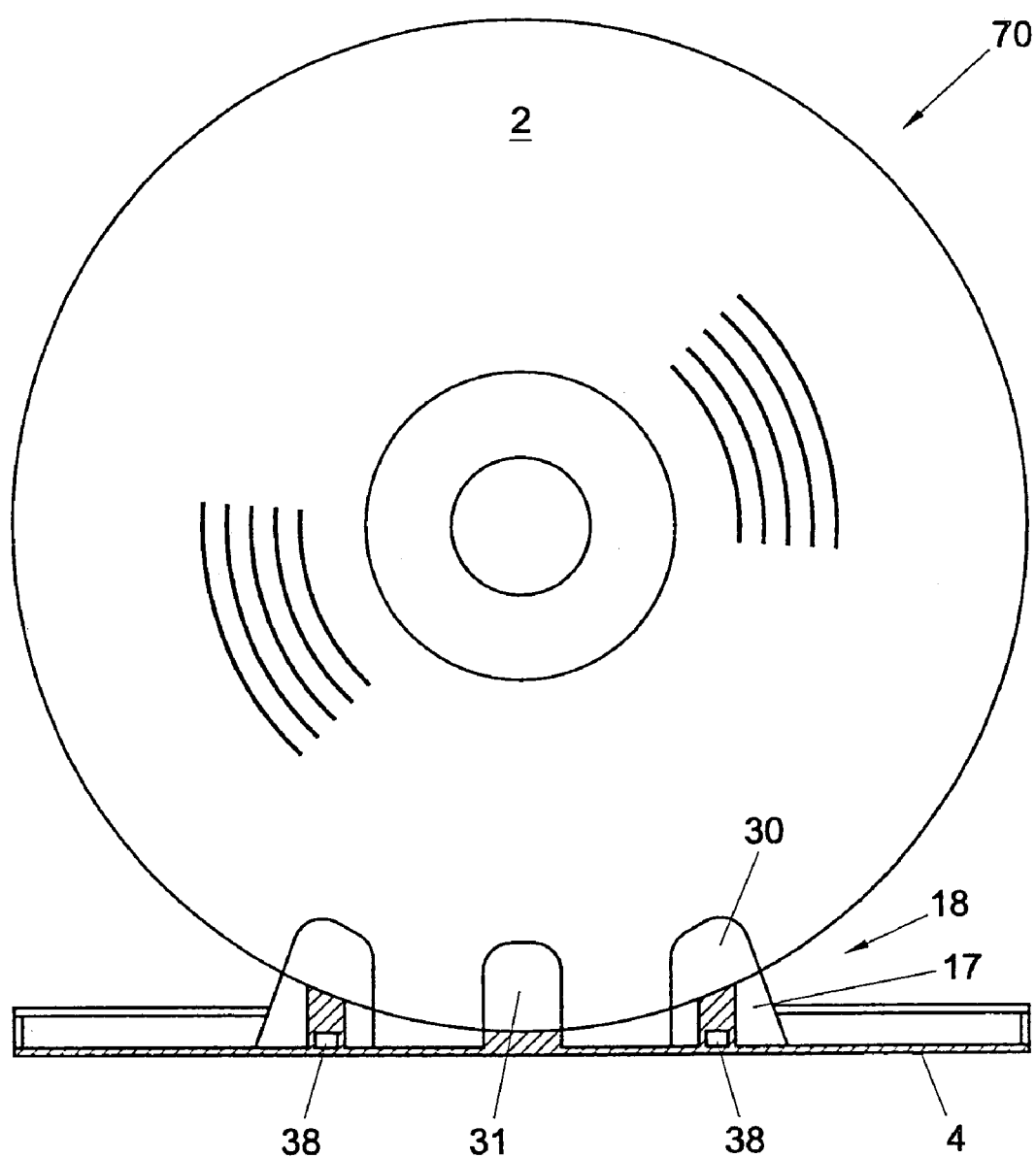
FIG. 4 is a sectional side elevation of a storage device according to FIG. 1 in a further alternative embodiment.
Figure 5:
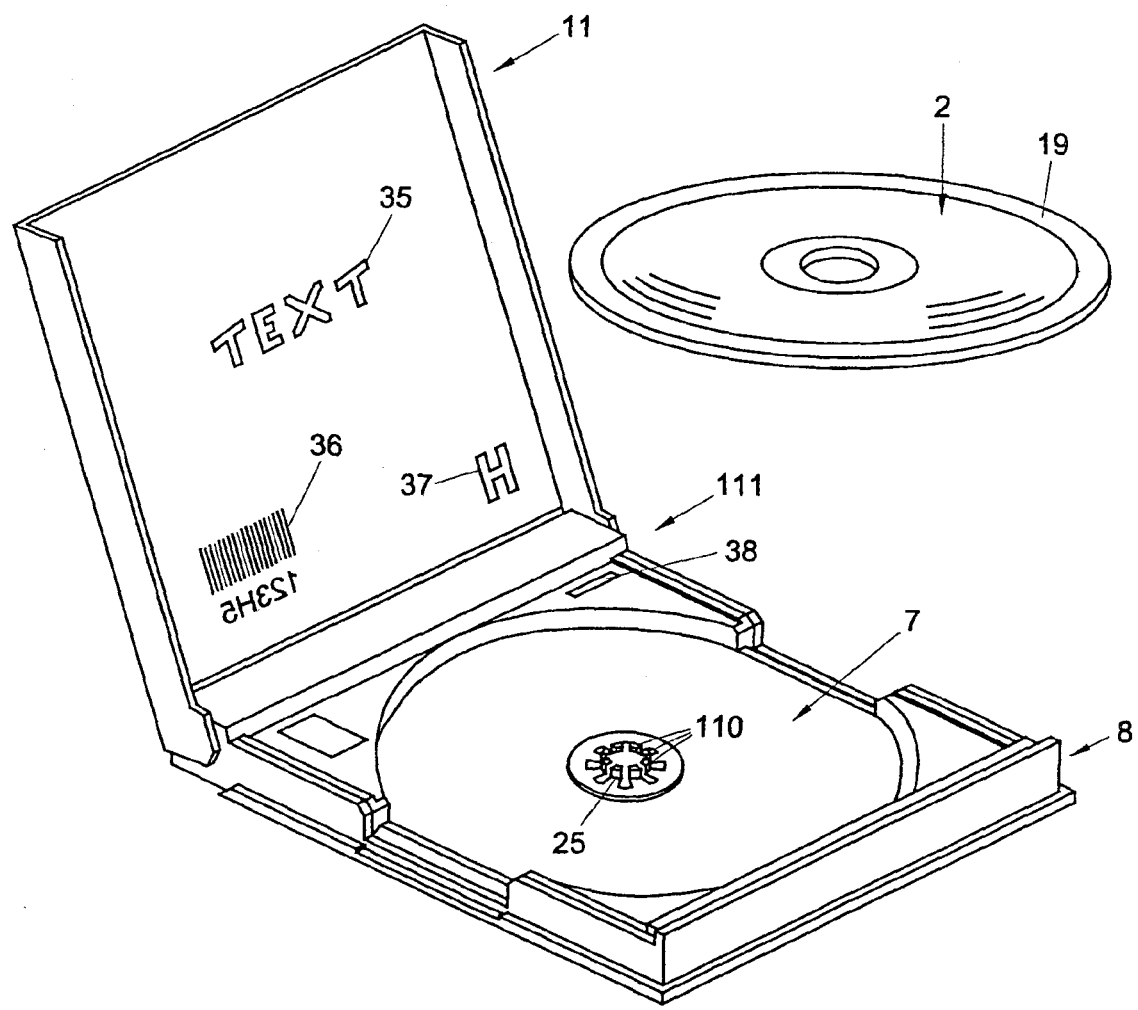
FIG. 5 is a perspective view of a storage device in a further alternative embodiment.

FIG. 4 shows an alternative embodiment of a storage device 70, with data carrier 2 included therein. In this relatively simple and compact embodiment, the clamping projections 17 are positioned directly on the intermediate part 4 in three pairs, so that the longitudinal edge of the data carrier 2 lies approximately against the center part 4. Hence, the groove 18 lies close against the center part and has two interrupted walls. At their free ends 30, the projections 17 slightly divert outwards, to form an insert opening for the data carrier 2 towards the clamping parts 31 of the projections 17, which insert opening converges in the direction of the center part.

In a usual manner, the closing parts 3, 5 are provided with means for including text booklets, librettos and like added information means.

FIG. 5 shows a jewel box of the known type, described in EP 0 420 350. However, in this embodiment, an integrated printing 37 is provided according to the invention. The resilient fingers 110 are moreover interconnected by sealing lips which are melted together after insertion of the CD. As a result, the CD cannot be removed before the sealing means are broken. Further, a magnetic strip 38 is integrally injection molded in the back 111 of the box, so that the jewel box is always traceable and, moreover, theft thereof is rendered considerably more difficult. Closing lips 25 and associated openings 24 may be provided, if so desired (not shown).

FIG. 6 schematically shows an apparatus 100 for manufacturing a storage device according to the invention, in particular according to FIGS. 1-4. In this Figure, the parts of the mold 101 are designated by the reference numerals of the parts of the storage device. This apparatus 100 comprises supply means 102 for a carrier 103 with printing 35-37, tension and transfer means 104 for the carrier 103 and an injection molding apparatus 105 with mold 101. On the carrier 103, manufactured from plastic, for instance film-shaped plastic having a thickness of less than 80 micrometer, for instance 20-30 micrometer, a printing 35 is provided with transfer ink. Preferably, this printing 35 is partially transparent, for instance built up from slightly spaced apart pixels. Preferably, the carrier 103 is transparent, so that the printing is visible from two sides of the carrier 103. If so desired, there are also provided on the carrier a bar-code 36 and a holographic image 37. The bar-code 36 may, for instance, be printed or impressed, the holographic image is, for instance, impressed or glued onto the carrier 103. The carrier 103 is rolled up in the supply means 102 and can be supplied, via the roll, to a frame 106 of the tension and transfer means 104. The carrier 103 is clamped on the frame 106, such that folds and the like are pulled smooth. By punch means 107, the carrier is cut to measure, for instance to the size of the first 3 and second closing part 5 and the intermediate part 4. The carrier 103 is fixed on the frame 106 through, for instance, clamping, reduced pressure, adhesion or static load. Next, by means of the tension and transfer device, the carrier 103 is transferred into the mold 101, with the carrier 103 being fixed against the wall of the mold 101, opposite the cavity for forming the fixing means. By static load, adhesion, suction or the like, the carrier 103 is secured, whereupon the frame 106 is pulled away. By support means 39, a magnetic strip 38 or an electric coil 38A or like authenticating and/or protective means is placed in, the mold. Next, the mold 101 is closed and a plastic mass is introduced into the injection molding apparatus 105 by means of an injector known per se and schematically shown as pump 108. Preferably, this mass has a high melt, for instance higher than 30 and preferably higher than 50. The mass flows through the mold cavity along the carrier 103. This involves sublimation of the carrier 103, while the printing 35, 36, 37 is incorporated onto and into the plastic skin of the flowing mass. In so far as the carrier 103 does not sublime or burn, it will be incorporated into the mass. Thus, in one shot, a storage device is obtained having a two-sided printing 35, magnetic strip or coil 38, 38A or the like, bar-code 36 and hologram 37.

Since use is made of a particularly high melt (higher than 20), long flow paths can be used at small wall thicknesses, for instance to less than 1 mm. The high melt offers the surprising advantage that the solidifying plastic mass, rolling down along the mold wall and hence the printing, which mass forms a thin skin, does not damage the printing (text, image, bar-code and the like), while undesired stresses in the material are moreover prevented. Thus, deformations of the storage devices are prevented. Thin walls offer the advantage that short cycle times are possible, little material is needed and the storage devices have little weight. As a result, dispatch is possible in a simple and advantageous manner.

In the embodiment shown in FIG. 6a, a printer head 120 is moveable in the mold 101 for providing a printing therein, preferably in transfer ink. Such ink is known per se and is properly incorporated into the plastic without running in an undesired manner. The printer head 120 is controlled by a computer 121, whereby the printing can be determined for any storage device to be injection molded. Thus, in principle, the printing can be adjusted for each individual storage device, for instance by changing a serial number of by an entirely different printing. Thus, an even better authentication is obtained. The computer may, for instance, be connected to a computer network for supplying desired printings online.

A storage device according to the invention can be used as follows.

In an injection molding machine as shown in FIG. 6, a storage device 1, 50, 70 is manufactured in one production operation and subsequently fed to a packaging line, with the closing parts 3, 5 lying flat on a conveying means, such as a conveyor belt. The intermediate part 4 extends approximately vertically, at least approximately at right angles to the plane of the conveying means and is open at the top (FIG. 1). A data carrier 2 is simply inserted into receiving means 13 by pressing a longitudinal edge 19 thereof between the clamping projections 17 and pushing it further in the direction of the bottom 20 of the groove 18. This causes the clamping projections 17 to be slightly pressed apart, while a clamping force is created, due to the deformation forces. Accordingly, the clamping projections 17 are pressed against the flat outer surfaces 21 of the data carrier. The groove has such a depth that information-carrying parts K are not reached by the clamping projections 17. Next, booklet and the like, if any, can be placed in the receiving means intended therefor.

After the data carrier 2 has been inserted between the clamping projections 17, the closing parts 3, 5 are swiveled in the direction of the intermediate part 4 and the data carrier 2, such that the or each closure is closed. This involves the fingers 25 slipping into the openings 24, such that their top ends 27 project therefrom. Next, these top ends are heated such that they melt slightly and widen across the edges of the opening 24. The starting position is shown in FIG. 7 on the left-hand side of the center line, the end situation is shown on the right-hand side. As FIG. 7 clearly demonstrates, the deformed ends 27 of the fingers 25 will have to be removed, for instance cut away, before the storage device can be opened. Thus, a proper authenticating seal is obtained.

In an alternative embodiment not shown, the fingers 25 are provided against an outer side of the wall parts of the opposite closing part. The fingers 25 have then at least partially fused with said wall parts through heating, such that the parts have to be cut loose from one another before the storage device can be opened. The materials used allow cutting in a simple manner, without directly involving breakage. Preferably, the fingers are received in slots, such that the sides of the storage device remain substantially flat.

FIG. 8 is a front view of a storage device 1 according to the invention, comprising a further alternative embodiment of protective means. In the embodiment shown, the storage device 1, which may have any embodiment shown in this specification, but which may, for instance, also be a storage device for other types of products, such as a bottle with screw cap, as shown schematically in FIG. 9, a package for loose bulk material such as pins and the like or medicine packages, comprises a first closing part 3 and a second closing part 5, again interconnected by a pivot 6, although loose closing parts can be used as well. In this specification, closing parts are also referred to as cover parts.

In the embodiment shown in FIG. 8, a strip-shaped element 40 of slight dimensions compared with the dimensions of the further storage device 1, is attached to the outer side of the storage device. A first end of the strip-shaped element 40 is secured against the first closing part 3, the opposite end is secured against the second closing part 5. Hence, the element 40 overlaps the seam 41 formed between the two closing parts and the two closing parts 3, 5 cannot be swiveled relative to each other. In the embodiment shown, the element 40 is provided on the side of the storage device remote from the pivot 6, for maximum protection. Of course, two or more of such elements 40 can be provided, also against sides other than the one mentioned. The or each band-shaped element 40 has a small thickness, for instance some tenths of millimeters or even less, for instance film-shaped. Preferably, the element 40 can readily be cut through or, optionally, torn, without damaging the storage device or the contents thereof. For that purpose, in an alternative embodiment, a weakening line may for instance be provided at the level of said seam 41.

FIG. 10 schematically shows an apparatus 60 whereby band-shaped elements 40 as shown in FIG. 8 can be secured on a storage device in a simple and fast manner. This apparatus 60 comprises a first roll 61 on which a strip 62 of plastic material, preferably of an ultrasonic weldable type, is wound. This strip 62 has a width that is slightly greater than the desired width of the band-shaped element 40, as appears from FIG. 11. The strip 62 is unwound from said first roll 61 and guided along a side of a storage device 1 against which the band-shaped element 40 is to be secured. At the level of said side of the storage device, a cutting tool 63 is moved against the strip 61 approximately at right angles to the feed-through direction S, to cut from the strip 62 a strip having the size of the desired band-shaped element 40, with a part 64 of the strip remaining on either side thereof. The cut or punched band-shaped element 40 is subsequently pressed against the storage device and secured against it in the desired position, preferably by ultrasonic welding or a like heat-joining technique. The band-shaped element 40 may also be glued against one or both parts 3, 5. The storage devices can automatically be supplied and discharged, for instance in a direction at right angles to the plane of the drawing. After the band-shaped element 40 has been cut from the strip 62, the strip 62 can be wound on a second roll 65. As the strip remains windable, the operation can be performed at a particularly great speed. Some tens to hundreds of band-shaped elements per minute.

FIG. 9 shows a medicine bottle 120 with screw cap 12, with a band-shaped element 40 being partially secured on the screw cap 121 and partially on the medicine bottle 120. Provided on the band-shaped element is a code 123, preferably by means of the cutting tool. This code may, for instance, comprise a date of manufacture, an indication of the type of medicine or the like.

It will be understood that when several band-shaped elements 40 are to be provided against a storage device, an apparatus 60 can have a corresponding number of first and second rolls and cutting tools. Of course, the band-shaped elements 40 may also be provided in another direction, for instance with a feed-through direction S parallel to the seam 41. A relatively long band-shaped element 40 may, for instance, extend over substantially the full length of the relevant side of the storage device 1. Also, loose band-shaped elements 40 may be supplied and secured against a storage device.

The invention is by no means limited to the embodiments represented in the drawings and specification. Many variations thereof are possible. For instance, a storage device according to the invention may be designed differently, for instance having several fixing means next to or behind one another, while the storage devices may moreover be manufactured from other materials. Also, other printing techniques may be applied. The printing may of course also be provided on the inner side or on both sides. For that matter, it will be clear that the printing techniques described may also be applied to other types of products. The data carriers may be inserted into the storage device at another moment, for instance in a shop, whereupon they can be sealed by means of said fingers and openings. These and many comparable variations are understood to fall within the framework of the invention outlined by the appended claims.

The invention claimed is:

1. A method for manufacturing a storage device for plate-shaped data carriers, said storage device having a first and a second cover pivotally connected, and having an authentication means, comprising:
    positioning an authentication means in a mold for injection molding one of said first and second covers such that said authentication means provides a surface against which injected plastic is molded, said authentication means comprising a printing provided on a carrier; and
    injection molding plastic against or around said authentication means in said mold, such that said authentication means cannot be removed from said first or second cover without damaging said authentication means and/or said first or second cover, and wherein said printing forms an integral part of said first or second cover formed in said mold, and wherein said carrier burns or sublimes, while the printing is incorporated on or into the plastic when said plastic is injected into said mold.

2. A method according to claim 1, further comprising supplying said carrier in a roll, and cutting a portion for placement in said mold before placing said portion in said mold.

3. A method according to claim 1, wherein said printing is designed as a transfer.

4. A method according to claim 1, wherein said printing further comprises providing a holographic printing.

5. A method according to claim 1, wherein said printing further comprises providing a bar-code.

6. A method according to claim 1, wherein said carrier is provided in said mold, having a printing on two sides, said plastic being provided against said carrier and undetachably connected thereto.

7. A method according to claim 6, wherein said carrier is at least partially transparent.

8. A method according to claim 1, wherein said authentication means is a magnetic and/or electronic means which is positioned on a carrier in the mold, and injecting plastic around the magnetic and/or electronic means, such that said carrier is enclosed or incorporated therein or disappears therein through burning or sublimation.

9. A method according to claim 1, further comprising providing a mold cavity in said mold for forming a fixing means within said storage device for fixing said plate shaped data carrier in said storage device.

10. A method according to claim 9, wherein said mold cavity for forming said fixing means in said first or second cover part is provided for holding a CD.

11. A method according to claim 9, wherein said mold cavity further comprises providing a surface for forming resilient fingers in said storage device for holding said data carrier in place.

12. A method according to claim 1, further comprising:
providing said carrier in a roll for feeding into said mold;
providing a frame for positioning a portion of said carrier containing said authentication means in said mold;
positioning said portion of said carrier on said frame;
positioning said frame holding said portion of said carrier in said mold against a sidewall of said mold; and
removing said frame from said mold prior to injecting said plastic.

13. A method according to claim 12, wherein further comprising cutting said portion of said carrier containing said authentication means from said roll prior to positioning said portion of said carrier onto said frame.

14. A method according to claim 13, wherein said mold further comprises forming the first and second covers in one piece with an integrated hinge to allow for a one piece storage device.

15. A method according to claim 14, further comprising providing a hinge cavity in said mold for forming an integrated one piece hinge between said first and second covers.

16. A method according to claim 13, wherein said plastic further comprises providing said plastic for injection molding with a melt of at least 30.

17. A method according to claim 13, wherein said plastic further comprises providing said plastic for injection molding with a melt of at least 50.

18. A method according to claim 1, wherein said injection molding plastic further comprises forming a transparent first or second cover for viewing said authentication means.

19. A method according to claim 18, wherein said authentication means further comprises providing a two-sided printing that is viewable from an inside surface and an outside surface of said first or second cover part.

20. A method according to claim 1, further comprising providing an electronically readable form related to said data carrier as said authentication means.

21. A method according to claim 1, further comprising stretching said carrier before or during placement in said mold, such that said carrier is pulled taut.

22. A method according to claim 1, wherein said plate shaped data carrier is a compact disc (CD) or a digital video disc (DVD), and wherein said authentication means comprises authentication information unique to the individual CD or DVD to be stored in said storage device.

23. A method according to claim 1, wherein said storage device is injection molded in one piece.

* * * * *

UNITED STATES PATENT AND TRADEMARK OFFICE
CERTIFICATE OF CORRECTION

PATENT NO. : 7,458,460 B2  Page 1 of 1
APPLICATION NO. : 10/659246
DATED : December 2, 2008
INVENTOR(S) : Hoogland et al.

It is certified that error appears in the above-identified patent and that said Letters Patent is hereby corrected as shown below:

<u>Column 3, line 28</u>:

Now reads:    "from the bottom port"

Should read:  --from the bottom part--

Signed and Sealed this

Twenty-eighth Day of April, 2009

JOHN DOLL
*Acting Director of the United States Patent and Trademark Office*